( 12 ) United States Patent
Holdenried et al.

(10) Patent No.: US 8,671,669 B2
(45) Date of Patent: Mar. 18, 2014

(54) EXHAUST GAS COOLER FOR A MOTOR VEHICLE

(75) Inventors: Jens Holdenried, Ditzingen (DE); Stefan Neher, Stuttgart (DE)

(73) Assignee: Behr GmbH & Co. KG, Stuttgart (DE)

( * ) Notice: Subject to any disclaimer, the term of this patent is extended or adjusted under 35 U.S.C. 154(b) by 271 days.

(21) Appl. No.: 13/026,655

(22) Filed: Feb. 14, 2011

(65) Prior Publication Data

US 2011/0138795 A1    Jun. 16, 2011

Related U.S. Application Data

(63) Continuation of application No. PCT/EP2009/059970, filed on Jul. 31, 2009.

(30) Foreign Application Priority Data

Aug. 12, 2008 (DE) .......................... 10 2008 038 629

(51) Int. Cl.
*F01N 3/02*    (2006.01)

(52) U.S. Cl.
USPC ............... 60/320; 60/298; 165/103; 165/283; 165/284

(58) Field of Classification Search
USPC ..................... 60/298, 320; 165/103, 283, 284
See application file for complete search history.

(56) References Cited

U.S. PATENT DOCUMENTS

| 4,993,367 | A   | * | 2/1991  | Kehrer ........................ 122/7 R |
| 5,794,575 | A   | * | 8/1998  | Sonnemann et al. ...... 123/41.08 |
| 6,244,256 | B1  | * | 6/2001  | Wall et al. ................ 123/568.12 |
| 7,461,640 | B1  | * | 12/2008 | Agee et al. ............... 123/568.12 |
| 2006/0090880 | A1 | * | 5/2006  | Sugihara et al. .............. 165/103 |
| 2006/0231243 | A1 | * | 10/2006 | Sugihara et al. .............. 165/158 |
| 2007/0006991 | A1 |   | 1/2007  | Anderson |

FOREIGN PATENT DOCUMENTS

| CA | 2 301 982 A1 | 9/2000 |
| DE | 196 33 190 A1 | 2/1998 |
| DE | 199 14 438 A1 | 10/2000 |
| DE | 10 2004 048 335 A1 | 4/2006 |
| EP | 1 148 231 A1 | 10/2001 |
| EP | 1 683 956 A1 | 7/2006 |
| FR | 2 883 807 A1 | 10/2006 |
| WO | WO 2005/064133 A1 | 7/2005 |
| WO | WO 2007/135021 A1 | 11/2007 |

* cited by examiner

*Primary Examiner* — Thomas Denion
*Assistant Examiner* — Brandon Lee
(74) *Attorney, Agent, or Firm* — Muncy, Geissler, Olds & Lowe, P.C.

(57) ABSTRACT

An exhaust-gas cooler for a motor vehicle is provided that includes a flow path which can be traversed by exhaust gas of an internal combustion engine and which has an inlet region and an outlet region for the exhaust gas, a housing which surrounds the flow path and which has at least one inlet and at least one outlet for a liquid coolant of a coolant circuit, wherein the coolant can flow around the flow path in order to cool the exhaust gas, and wherein the coolant circuit is formed as a main cooling circuit of the internal combustion engine of the motor vehicle, wherein the exhaust-gas cooler is arranged in the main cooling circuit in series with the internal combustion engine.

14 Claims, 3 Drawing Sheets

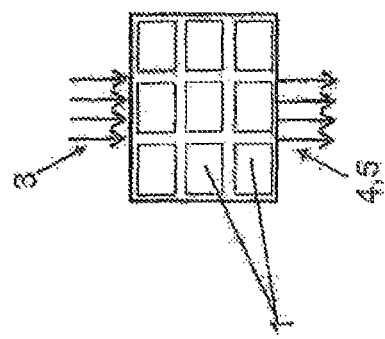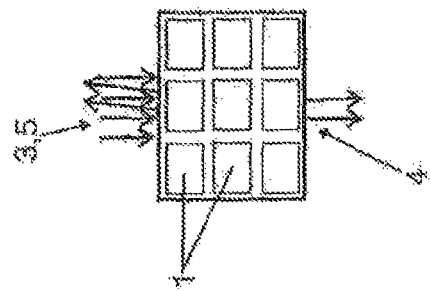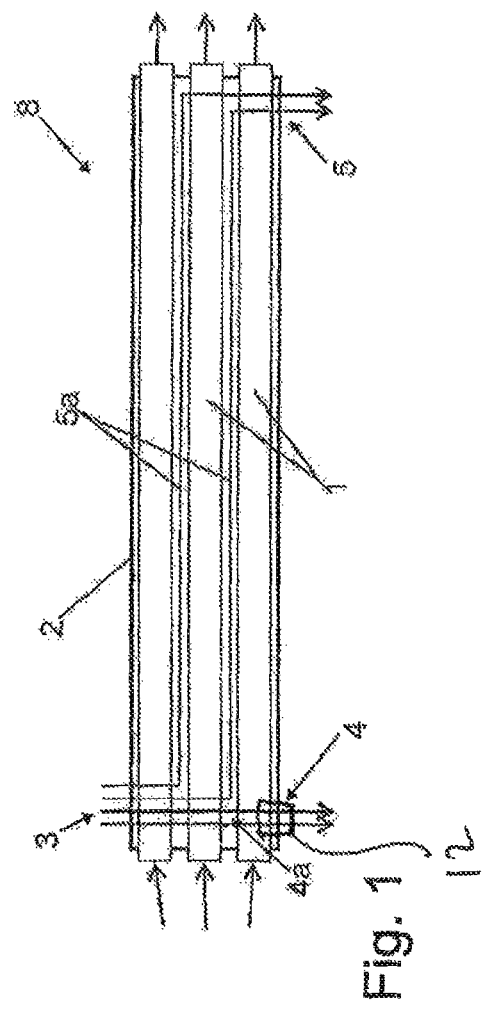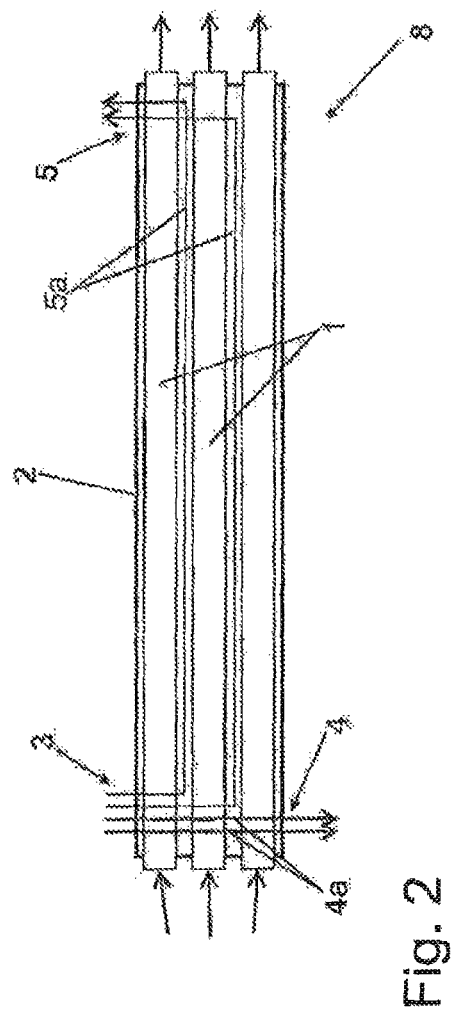
Fig. 1
Fig. 2

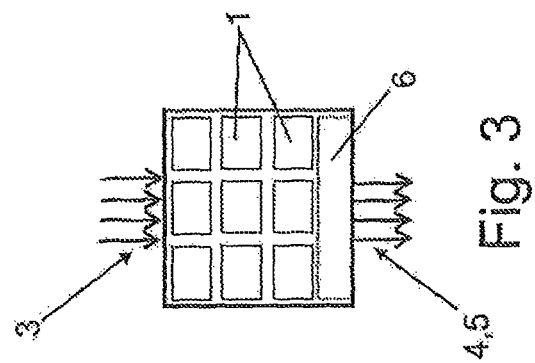
Fig. 3
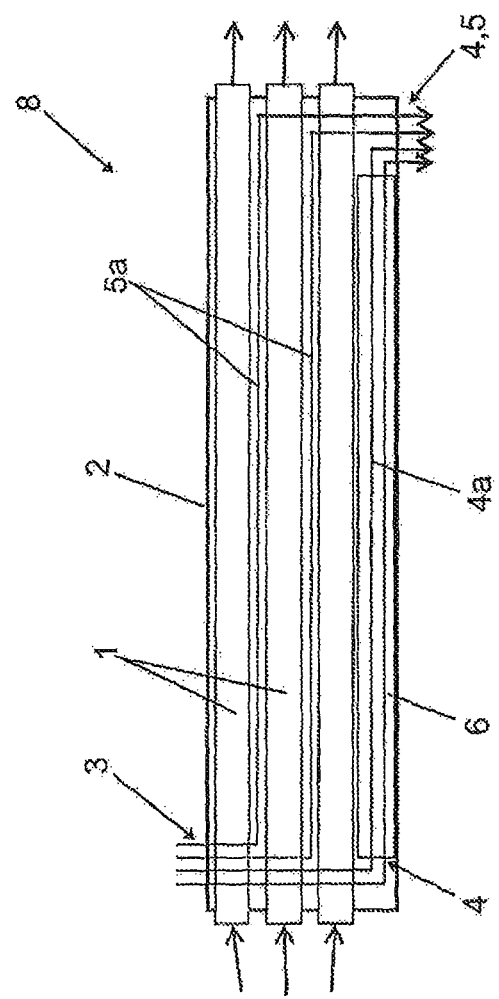

EXHAUST GAS COOLER FOR A MOTOR VEHICLE

This nonprovisional application is a continuation of International Application No. PCT/EP2009/059970, which was filed on Jul. 31, 2009, and which claims priority to German Patent Application No. DE 10 2008 038 629.4, which was filed in Germany on Aug. 12, 2008, and which are both herein incorporated by reference.

BACKGROUND OF THE INVENTION

1. Field of the Invention

The present invention relates to an exhaust gas cooler for a motor vehicle.

2. Description of the Background Art

Exhaust gas coolers for cooling recirculated exhaust gas are widely used, in particular for the purpose of pollutant reduction. For the most part, exhaust gas coolers are employed in conjunction with diesel engines, but applications for exhaust gas cooling in gasoline engines exist in the meantime, as well.

EP 1 683 956 A1, which corresponds to U.S. Publication No. 20060231243, and which describes a cooler for returned exhaust gas of an internal combustion engine in which a bundle of exchanger tubes is located in a housing through which coolant flows. The coolant enters the housing in the vicinity of an inlet for the exhaust gas and exits the housing in the vicinity of an outlet for an exhaust gas. Located opposite the inlet for the coolant is a small-diameter outlet fitting through which a small partial stream of the coolant exits in order to prevent flow stagnation of the coolant in the inlet region of the exchanger tubes.

These and other prior art exhaust gas coolers are typically incorporated into a secondary flow of a primary cooling circuit of a motor vehicle, or into a branch of a primary cooling circuit that is parallel to an internal combustion engine. In this way, only a small fraction of the total coolant circulation passes through the housings of the prior art exhaust gas coolers.

SUMMARY OF THE INVENTION

It is therefore an object of the present invention to provide an exhaust gas cooler that is especially simple to integrate into a cooling circuit while providing good cooling output.

As a result of the arrangement of the exhaust gas cooler in series with the internal combustion engine in an embodiment, the complicated branching of a parallel branch or secondary flow is rendered unnecessary. In general, this also provides the option of ensuring an improved cooling of the exhaust gas, since a substantially higher coolant flow is inherently available to the exhaust gas cooler. Depending on the requirements, this also makes it possible to achieve an equivalent or even improved cooling output with a higher coolant temperature as compared to the prior art.

In an embodiment, provision is made for a first and a second outlet to be provided for the coolant, wherein a first partial stream of the coolant flowing in through the inlet flows out through the first outlet, and a second partial stream of the coolant flowing in through the inlet flows out through the second outlet. In this way, the greater coolant flow resulting from the arrangement in the cooling circuit is divided in a simple manner into two partial streams, with a greater mass flow through the heat exchanger being made possible overall.

In an embodiment, the first outlet and the inlet for the coolant are each located at the inlet region of the flow path. Furthermore, provision can be made here for the first partial stream to be greater than the second partial stream, at least during normal operation of the exhaust gas cooler (average load and speed of the internal combustion engine). Accordingly, it is preferred for the first partial stream to flow transversely through the housing over a short distance from the inlet to the first outlet and to represent a significant portion of the total mass flow of the coolant in the primary cooling circuit. By this means, precisely the critical inlet region of the hot exhaust gas in the flow path can be cooled especially effectively, while efficaciously avoiding boiling of the coolant caused by unfavorable flow conditions. The second partial stream preferably can run essentially parallel to the flow path, by which means an effective heat transfer takes place from the exhaust gas to the second partial stream in a known manner.

In an embodiment of the invention, provision is made for the first outlet to be routed to the second outlet by means of a passage, which in particular is integrated in the housing, so that a total of just one single outlet connection is provided for carrying the coolant away from the exhaust gas cooler. In this way, it is possible to implement a compact construction with an especially small number of external connections and hoses.

To ensure adequate partial streams of coolant at different loads and speeds of the internal combustion engine, it is possible to provide a regulating element by means of which a distribution of the overall coolant stream between the first and second partial streams can be altered. It is thus possible to direct a larger portion to the second partial stream at idle speed, for example, but to predominantly direct the coolant mass flow to the first partial stream, at least at high speeds and normal driving operation when the coolant mass flow is large. In a preferred detail design, the regulating element can be designed as a passive, in particular spring-loaded, throttle element. Such an element can be provided advantageously in the region of the first outlet in the manner of a spring-loaded slide valve, for example, so that the first outlet opens further with increasing motor speed and increasing pressure rise of the coolant stream, with a second partial stream of adequate size being provided at the same time for cooling of the exhaust gas at low speed through the throttling of the first outlet. In an alternative embodiment as a function of requirements, the regulating element can also be an active, in particular controllable, actuator. This may be designed as a throttle valve, or also as an adjustable throttle cross-section, or in a similar manner, and can be operated by means of an actuator. In this way, an especially optimized distribution of the coolant stream between the two partial streams can take place in conjunction with an electronic control unit of the motor vehicle.

It is generally advantageous for the exhaust gas cooler to have a construction in which the flow path for the exhaust gas is designed as a bundle of exchanger tubes. Such exhaust gas coolers are robust and economical to produce, and have broad application using this design principle.

In addition, provision can be made for a bypass line for directing a portion of the overall coolant stream to run parallel to the exhaust gas cooler. Especially with very high coolant flows, such a bypass line can be useful in order to always direct a portion of the coolant around the entire exhaust gas cooler. In this way, unnecessary oversizing of the inlets or outlets and housing of the exhaust gas cooler can be avoided, even though the exhaust gas cooler as a whole is arranged in series in the primary cooling circuit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 shows a schematic cross-sectional view of an exhaust gas cooler in accordance with a first exemplary embodiment of the invention;

FIG. 2 shows a variation of the exemplary embodiment from FIG. 1;

FIG. 3 shows another exemplary embodiment of an exhaust gas cooler according to the invention.

DETAILED DESCRIPTION

Figure 4:
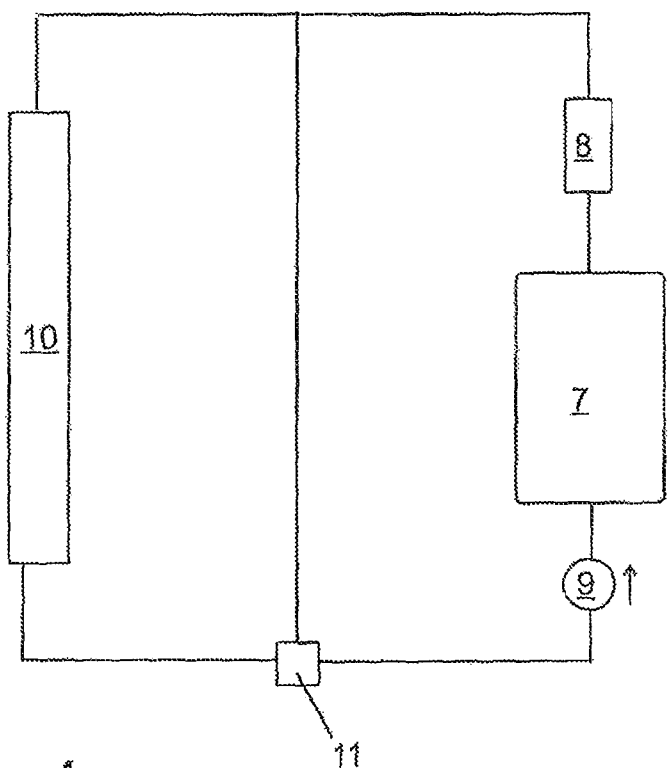
FIG. 4 shows a schematic view of a cooling circuit with an exhaust gas cooler according to the invention.

In a first exemplary embodiment of an exhaust gas cooler shown in FIG. 1, a flow path for exhaust gas from an internal combustion engine 7 (see FIG. 4) designed as a bundle of exchanger tubes 1 is arranged in a housing 2, wherein a liquid coolant of a primary cooling circuit of the internal combustion engine flows through the housing 2 for cooling the exhaust gas carried in the tubes 1.

The coolant passes into the housing 2 through an inlet 3 located in the region of the inlet of the exhaust gas into the housing 2. A first outlet 4 is provided opposite the inlet 3 in the direction perpendicular to the exchanger tubes 1. A second outlet 5 is located at the opposite outlet region of the exchanger tubes 1 in the longitudinal direction of the tubes 1.

As is illustrated by the flow arrows in FIG. 1, the coolant stream entering through the single inlet 3 divides into a first partial stream 4a and a second partial stream 5a, with the first partial stream 4a flowing through the short transverse side of the housing 2 essentially perpendicular to the exchanger tubes 1, and the second partial stream 5a flowing through the housing 2 in the longitudinal direction parallel to the exchanger tubes 1. There is no spatially separated routing of the partial streams within the housing in this design. However, baffles or similar measures may be provided to optimize the distribution and path of the partial streams.

The exhaust gas cooler 8 is arranged in the primary cooling circuit of the internal combustion engine 7 in series with the internal combustion engine (see FIG. 4), so that a substantial coolant stream passes through it. The present example deals with an exhaust gas cooler for use with a medium-sized diesel engine of a commercial vehicle in the output range of approximately 200 kW. The typical cooling circuit of such an internal combustion engine delivers approximately 5-10 liters of coolant per second. In the present exemplary embodiment, this entire quantity of coolant passes through the exhaust gas cooler. Here, most of the coolant stream enters the first partial stream 4a, at least at higher speeds. Depending on the speed, the first partial stream is typically 5 l/s, for which purpose the inlet opening 3 and the first outlet opening 4 are dimensioned accordingly.

The proportion of coolant entering the second partial stream 5a is smaller, and is typically 1-2 l/s under normal operating conditions such as average speed and load.

It is evident that the large coolant throughput of the first partial stream 4a provides an especially good cooling of the exchanger tubes at their inlet region into the housing, so that boiling of the coolant in the region of the still especially hot exhaust gases there is efficaciously avoided.

In order to ensure a necessary minimum for the second partial stream over a wide speed range, provision is made to locate a regulating element 12 in the first outlet 4. The regulating element 12 may be a throttle valve that accomplishes a passive control of the cross-section of the first outlet 4 by means of a spring-loaded slide. With increasing speed, the pressure of the coolant stream on the spring-loaded throttle valve rises, and progressively opens the valve so that the size of the first partial stream increases disproportionately to the size of the second partial stream with increasing speed. The regulating element 12 may also be an active, in particular controllable, actuator.

FIG. 2 shows a variation of the first exemplary embodiment in which, as the sole difference, the second coolant outlet is not located on the side of the housing opposite the coolant inlet, but instead on the same side of the housing. This can offer advantages, especially when there are corresponding demands on installation space.

FIG. 3 shows another exemplary embodiment of the invention in which a total of only one external connection for coolant inlet and one external connection for coolant outlet are present. In this design, the first outlet 4 coincides with the beginning of a passage 6 that is integrated in the housing 2 and joins the second outlet 5 in the vicinity thereof. Within the concept of the invention, the passage 6 for the coolant thus is not part of the housing 2 or the space surrounding the exchanger tubes, but instead constitutes a coolant line integrated therein, by which means the number of external connections of the exhaust gas cooler is reduced and the number of sections of hose required for connecting the exhaust gas cooler to the internal combustion engine is reduced. Within the concept of the invention, the exemplary embodiment shown in FIG. 3 also has two coolant outlets 4, 5 from the space surrounding the exchanger tubes.

FIG. 4 shows an example for the integration of an above-described exhaust gas cooler 8 in the cooling circuit of the internal combustion engine 7, which also includes a coolant pump 9, a radiator 10, and a thermostatic valve 11.

In this design, the exhaust gas cooler 8 is arranged in series with the internal combustion engine 7 in the primary stream of the coolant circuit. In the present case, the exhaust gas cooler is located after the internal combustion engine 7 in the direction of coolant flow, so that the coolant flowing through the exhaust gas cooler has an especially high temperature. Nonetheless, an equally good cooling of the exhaust gas can be ensured on account of the strong flow of the first partial stream 4a around the inlet area of the exchanger tubes 1. Depending on requirements, the exhaust gas cooler 8 can of course also be located ahead of the internal combustion engine 7.

It is a matter of course that the individual features of the various exemplary embodiments can be usefully combined with one another as a function of requirements.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An exhaust gas cooler for a motor vehicle, the cooler comprising:
   a flow path configured such that exhaust gas of an internal combustion engine flows there through;
   the flow path having an inlet region and an outlet region for the exhaust gas; and
   a housing enclosing the flow path, the housing having at least one inlet and at least one outlet for a liquid coolant of a coolant circuit to cool the exhaust gas,
   wherein a first outlet and a second outlet are provided for the coolant, wherein a first partial stream of the coolant flowing in through the inlet flows out through the first outlet, and wherein a second partial stream of the coolant flowing in through the inlet flows out through the second outlet, wherein the first outlet and the second outlet directly open to an exterior of the housing,
   wherein the first outlet and the second outlet are each dimensioned such that a throughput of the first partial stream is greater than a throughput of the second partial stream at least during normal operation of the exhaust gas cooler, and
   wherein the first outlet directly opens to the exterior of the housing at the inlet region of the first flow path and the second outlet directly opens to the exterior of the housing at the outlet region of the flow path.

2. The exhaust gas cooler according to claim 1, wherein the inlet for the coolant is arranged at the inlet region of the flow path.

3. The exhaust gas cooler according to claim 1, wherein the second partial stream runs substantially parallel to the flow path.

4. The exhaust gas cooler according to claim 1, further comprising a regulating element via which a distribution of the overall coolant stream between the first and second partial streams is altered.

5. The exhaust gas cooler according to claim 4, wherein the regulating element is designed as a passive, in particular spring-loaded, throttle element.

6. The exhaust gas cooler according to claim 4, wherein the regulating element is designed as an active, in particular controllable, actuator.

7. The exhaust gas cooler according to claim 4, wherein the regulating element is located in the region of the first outlet.

8. The exhaust gas cooler according to claim 1, wherein the flow path for the exhaust gas is designed as a bundle of exchanger tubes.

9. An exhaust gas cooling system comprising:
   a cooling circuit containing a primary stream of coolant; and
   an internal combustion engine and an exhaust gas cooler arranged in series along the cooling circuit, such that the primary stream of coolant flows through the internal combustion engine and the exhaust gas cooler in series,
   wherein the exhaust gas cooler comprises:
      a flow path configured such that exhaust gas of the internal combustion engine flows therethrough;
      the flow path having an inlet region and an outlet region for the exhaust gas; and
      a housing enclosing the flow path, the housing having at least one inlet and a first outlet and a second outlet for a liquid coolant of a coolant circuit to cool the exhaust gas,
      wherein a first partial stream of the coolant flowing in through the at least one inlet flows out through the first outlet and a second partial stream of the coolant flowing in through the at least one inlet flows out through the second outlet,
      wherein the first outlet and the second outlet are each dimensioned such that a throughput of the first partial stream is greater than a throughput of the second partial stream at least during normal operation of the exhaust gas cooler, and
      wherein the first outlet directly opens to an exterior of the housing at the inlet region of the first flow path and the second outlet directly opens to the exterior of the housing at the outlet region of the flow path.

10. The exhaust gas cooler according to claim 1, wherein the entire first partial stream runs substantially perpendicular to the flow path.

11. The exhaust gas cooler according to claim 1, wherein the first outlet is arranged on an opposite side of the housing as the inlet.

12. The exhaust gas cooler according to claim 1, wherein the second outlet is arranged on an opposite side of the housing as the inlet.

13. The exhaust gas cooler according to claim 1, wherein the second outlet is arranged on a same side of the housing as the inlet.

14. The exhaust gas cooling system according to claim 9, wherein a bypass line for directing a portion of the coolant stream runs parallel to the exhaust gas cooler.

* * * * *